(12) United States Patent
Bolenbaugh et al.

(10) Patent No.: US 9,062,724 B2
(45) Date of Patent: Jun. 23, 2015

(54) CONTROLS AND DIAGNOSTICS FOR MECHANICAL FRICTION ELEMENTS

(71) Applicant: GM GLOBAL TECHNOLOGY OPERATIONS LLC, Detroit, MI (US)

(72) Inventors: Jonathan M. Bolenbaugh, Ann Arbor, MI (US); Besim Demirovic, Troy, MI (US); Lawrence A. Kaminsky, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 175 days.

(21) Appl. No.: 13/674,993

(22) Filed: Nov. 13, 2012

(65) Prior Publication Data

US 2014/0136033 A1   May 15, 2014

(51) Int. Cl.
*B60W 10/02*   (2006.01)
*F16D 48/06*   (2006.01)
*B60W 20/00*   (2006.01)
*B60K 6/383*   (2007.10)
*B60K 6/445*   (2007.10)

(52) U.S. Cl.
CPC ............. *F16D 48/06* (2013.01); *B60W 20/00* (2013.01); *Y10S 903/946* (2013.01); *B60K 6/383* (2013.01); *B60K 6/445* (2013.01); *Y02T 10/6239* (2013.01)

(58) Field of Classification Search
CPC ........ B60K 6/445; B60K 6/365; B60K 6/383; B60W 20/00; B60W 30/19; B60W 10/08; Y02T 10/642; Y02T 10/6239; F16H 2037/0866; F16H 2037/102; F16H 2061/6603; F16H 2037/101; F16H 55/24; Y10S 903/946
USPC ................................ 701/67; 74/409; 903/946
See application file for complete search history.

*Primary Examiner* — Adam Tissot

(57) ABSTRACT

A powertrain system includes an internal combustion engine, at least one electric machine and an electro-mechanical transmission operative to transmit torque to a drive line. A method for controlling the powertrain system includes executing an engagement strategy of a one-way clutch device only having capacity in a first direction. The engagement strategy includes modeling a capacity of the one-way clutch device in accordance with a loading step change profile until a first capacity limit of the one-way clutch device is achieved. A continuous reactive load is applied to the one-way clutch device in the first direction to maintain engagement and inhibit lash of the one-way clutch device.

20 Claims, 3 Drawing Sheets

CONTROLS AND DIAGNOSTICS FOR MECHANICAL FRICTION ELEMENTS

TECHNICAL FIELD

This disclosure is related to control systems for electro-mechanical transmissions, and more specifically to managing capacity of mechanical diodes.

BACKGROUND

The statements in this section merely provide background information related to the present disclosure. Accordingly, such statements are not intended to constitute an admission of prior art.

Hybrid powertrain architectures include torque-generative devices, including internal combustion engines and electric machines, which transmit torque through a transmission device to a vehicle driveline. Exemplary electro-mechanical transmissions are selectively operative in fixed gear modes and continuously variable modes through actuation of torque-transfer clutches. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch activation and deactivation is typically effected through a hydraulic circuit, including electrically-actuated hydraulic flow management valves, pressure control solenoids, and pressure monitoring devices controlled by a control module.

It is known to utilize one-way clutches to ground a rotatable driving member or input member such as an input race or first coupling plate, to a transmission housing/casing. In application, the clutch is engaged when the driving member is rotating in a first direction. When the driving member is in an opposite or second direction, the clutch will release or decouple the driving member from being grounded. Once released, the driving member is free to rotate in the second opposite direction. In this mode, the one-way clutch is free to overrun or "freewheel." The driving member can include a transmission input member coupled to the engine. When the driving member rotates in the first direction it is grounded due to engagement of the one-way clutch, and thus, back-torque applied to the engine is inhibited.

It is known to assume current slip diagnostics are directionally independent for hydraulically actuated clutches. Thus, an assumption is made that a hydraulically actuated clutch has equivalent capacity in either direction. However, one-way clutches, such as mechanical diodes, only have capacity in one direction and freewheel in the other opposite direction. Accordingly, it is not desirable to apply slip speed based clutch slip detection to mechanical diodes when a load is applied in the freewheeling direction.

SUMMARY

A powertrain system includes an internal combustion engine, at least one electric machine and an electro-mechanical transmission operative to transmit torque to a drive line. A method for controlling the powertrain system includes executing an engagement strategy of a one-way clutch device only having capacity in a first direction. The engagement strategy includes modeling a capacity of the one-way clutch device in accordance with a loading step change profile until a first capacity limit of the one-way clutch device is achieved. A continuous reactive load is applied to the one-way clutch device in the first direction to maintain engagement and inhibit lash of the one-way clutch device.

BRIEF DESCRIPTION OF THE DRAWINGS

One or more embodiments will now be described, by way of example, with reference to the accompanying drawings, in which.

DETAILED DESCRIPTION

Figure 1:
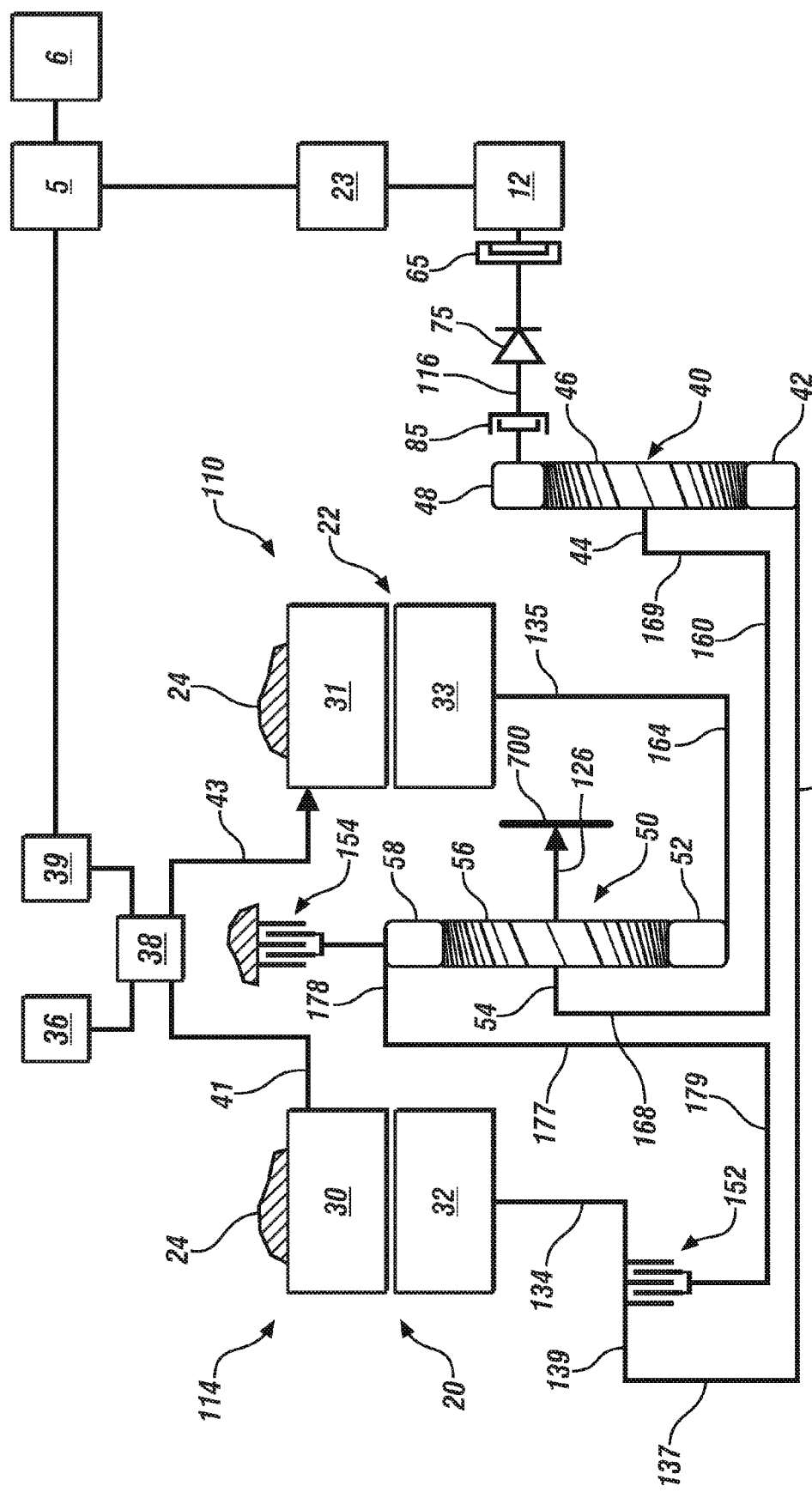
FIG. 1 illustrates a powertrain system having an internal combustion engine drivingly connected with a electro-mechanical transmission, a driveline, and a controller, in accordance with the present disclosure.

Referring now to the drawings, wherein the showings are for the purpose of illustrating certain exemplary embodiments only and not for the purpose of limiting the same, FIG. 1 illustrates a powertrain 110 having an internal combustion engine 12 drivingly connected with a electro-mechanical transmission 114. An output member of the engine 12 is connected for driving an input member 116 of the transmission 114.

A first electric machine 20 and a second electric machine 22 are packaged within a case housing/ground 24 and are operatively connected between the input member 116 and a transmission output member 126 that reacts with a driveline 700. The driveline 700 can collectively include a chain drive including a drive sprocket coupled to the output member 126 that drives a driven sprocket coupled to a final drive that transfers the motive torque to the vehicle wheels. The first electric machine 20 includes an annular stator 30 grounded to the transmission casing 24, an annular rotor 32 supported on and for rotation with a rotatable rotor hub 134. A high-voltage battery 36, power inverter 38 and electronic controller 39 are operatively connected with the stator 30 via transfer conductor 41 to control the functioning of the first electric machine 20 as a motor, in which stored electrical power is provided by the battery 36 to the stator 30 or the electrical power can be provided by the road when the second electric machine 22 is acting as a generator, and a generator, in which torque of the rotating rotor 32 is converted to electrical power stored in the battery 36 or used by the second electric machine.

Similarly, the second electric machine 22 includes an annular stator 31 grounded to the transmission casing 24, an annular rotor 33 supported on a rotatable rotor rub 135. The battery 36, power inverter 38 and electronic controller 39 are operatively connected with the stator 31 via transfer conductor 43 to control the functioning of the second electric machine 22 as a motor and a generator.

The transmission 114 further includes first and second planetary gear sets 40, 50, respectively. Planetary gear set 40 has a first member that is a sun gear 42, a second member that is a carrier member 44 that rotatably supports a plurality of pinion gears 46 meshing with the sun gear 42, and a third member that is a ring gear 48 meshing with the pinion gears 46.

Planetary gear set 50 has a first member which is a sun gear 52, a second member that is a carrier member 54 that rotatably supports a plurality of pinion gears 56 meshing with the sun gear 52, and a third member that is a ring gear 58 meshing with the pinion gears 56. Rotor hub 135 is connected for rotation with the sun gear 52 by intermediate sleeve shaft 164.

The transmission 114 includes a first clutch 154 and a second clutch 152. The first clutch 154, also referred to as a grounding clutch or brake, is selectively activated to ground the ring gear member 58 to the transmission casing 24. The input member 116 is axially spaced from and not concentric with shaft 160, which couples the carrier member 44 of the first planetary gear set 40 and the carrier member 54 of the second planetary gear set 50. Shaft 162 couples rotor hub 134 with sun gear 42 via hub member 137 and an axially-extending portion 139. The second clutch 152 is nested between an axially extending portion 139, a hub 137 and a shaft. A hub member 177 is connected with the second clutch 152. A separate sleeve shaft 160 concentric with shaft 162 couples carrier member 54 and hub member 168 and 169 to carrier member 44. Sleeve shaft 164 couples rotor hub 135 with sun gear 52. Axially-extending member 178, hub 177 and axially-extending member 179, which is an annular shaft, couples the second clutch 152 with the first clutch 154 and ring gear 58. Axial-extending member 178 circumscribes the planetary gear set 50. It will be appreciated that the ring gear member 58 is decoupled from the sun gear member 42 when the second clutch 152 is deactivated.

The input member 116 may include a damping component 65, a one-way clutch device 75 and a torque limiter device 85 located between the engine 12 and the transmission 114. In an exemplary embodiment, the one-way clutch device 75 includes a mechanical diode preventing rotation of the input member 116 in one direction when the mechanical diode is engaged and allowing the input member 116 to free-wheel in the other opposite direction. The torque limiter device 85 can include a torque converter.

An engine control module (ECM) 23 is operatively connected to the engine 12, and functions to acquire data from sensors and control actuators of the engine 12 over a plurality of discrete lines. The ECM 23 monitors an actual engine input torque, $T_I$, provided to the transmission 114 at that point in time based upon monitored engine speed and load, which is communicated to a hybrid control module (HCP) 5. The electronic controller 39 monitors a first motor torque of the first electric machine 20 and a second motor torque of the second electric machine 22. Alternatively, two electronic controllers can be utilized, each controller monitoring respective ones of the first and second electric machines 20, 22, respectively. The HCP 5 provides supervisory control over the ECM 23 and the electronic controller 39 and a user interface 6 which is operatively connected to receive inputs from a vehicle operator. The HCP 5 can further control activation and deactivation of the first and second clutches 154, 152, respectively. The HCP can further control engagement and manage torque capacity of the one-way clutch device 75. The HCP 5 coordinates torque commands amongst the engine 12 and the first and second electric machines 20, 22, respectively, to establish desired operation of the transmission 114 in response to an operator input to a user interface 6. The user interface 6 can include an accelerator pedal, a brake pedal, cruise control and/or a gear selector lever.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
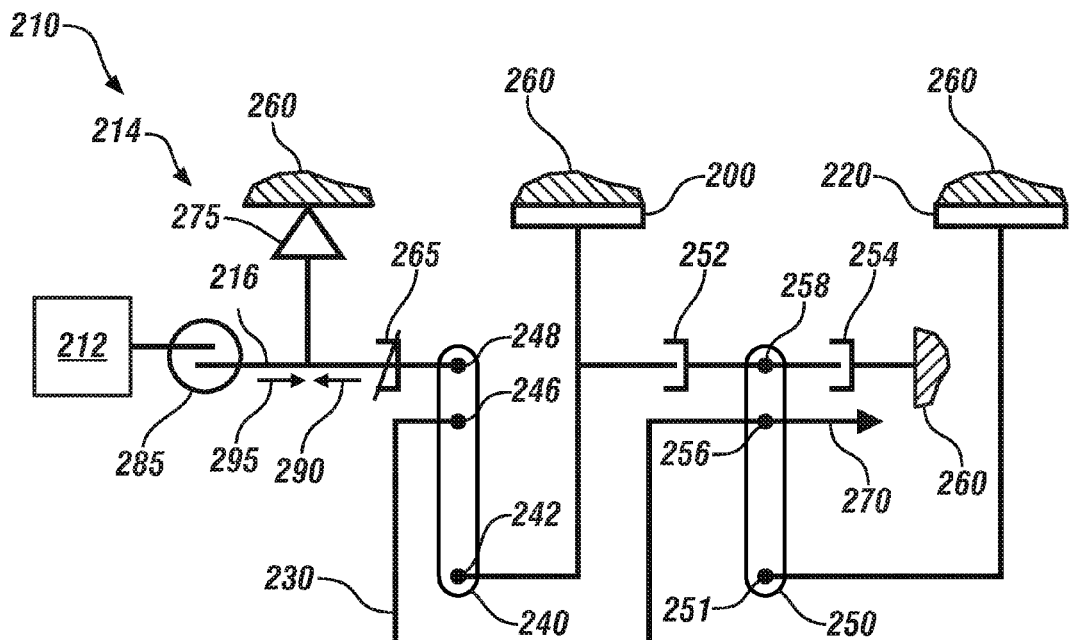
FIG. 2 illustrates a lever diagram including the powertrain system illustrated in FIG. 1, in accordance with the present disclosure.

FIG. 2 illustrates a lever diagram for the powertrain system 110 illustrated in FIG. 1 in accordance with the present disclosure. The transmission 214 is configured to transfer torque between the internal combustion engine, first and second electric machines 200, 220, respectively, and the output member 270 coupled to the driveline of the vehicle. The transmission 214 includes first and second planetary gear sets 240, 250, respectively, the first clutch 254, the second clutch 252 and the case ground 260. Thus, with reference to FIG. 1, the second planetary gear set 250 corresponds to the second planetary gear set 50, the first planetary gear set 240 corresponds to the first planetary gear set 40, the first clutch 254 corresponds to the first clutch 154 and the second clutch 252 corresponds to the second clutch 152 and the case ground 260 corresponds to the transmission casing 24.

The first planetary gear set 240 includes a first element 248, a second element 246 and a third element 242. The third element 242 is coupled to the first electric machine 200 and coupled to one element of the second clutch 252. The second element is coupled to a rotating shaft 230 and the first element 248 is coupled to the engine 212 via the input member 216. In the exemplary embodiment with reference to FIG. 1, the first element 248 corresponds to the ring gear 48, the second element 246 corresponds to the carrier member 46, the third element 242 corresponds to the sun gear 42, the first electric machine 200 corresponds to the first electric machine 20, the rotating shaft 230 corresponds to shaft 160 and the engine 120 corresponds to the internal combustion engine 12.

Similarly, the second planetary gear set 250 includes a first element 258, a second element 256 and a third element 251. The first element 258 is coupled to the other element of the second clutch 252 and coupled to one element of the first clutch. Hence, the first element 258 is coupled to the first electric machine 200 when the second clutch 252 is activated and decoupled from the first electric machine 200 when the second clutch is deactivated. The second element 256 is coupled to the rotating shaft 230 and the output member 270. The third element 251 is coupled to the second electric machine 220. The other element of the first clutch 254 is coupled to the case ground 260. Hence, the first clutch 254 is a grounding clutch configured to ground the first element 258 of the second planetary gear set 250. With reference to FIG. 1, the first element 258 corresponds to the ring gear 58, the second element 256 corresponds to the carrier member 56, the third element 251 corresponds to the sun gear 52, the second electric machine 220 corresponds to the second electric machine 22 and the output member 270 corresponds to the output member 126. It will be understood that the first and second clutches 154, 152, respectively, are hydraulically controlled.

The input member 216 includes damping device 285, one-way clutch device 275 and torque limiter device 265 located between the engine 220 and the transmission 214. In an exemplary embodiment with reference to FIG. 1, the damping component 285 corresponds to the damping component 85, the one-way clutch device 275 corresponds to the one-way clutch device 75 and the torque limiter device 285 corresponds to the torque limiter device 85. In an exemplary embodiment, the torque limiter device 265 is a torque converter. The one-way clutch device 275 includes a mechanical diode preventing rotation of the input member 216 in a first direction 290 when the one-way clutch device 275 is engaged, i.e., the input member 216 is grounded in the first direction 290. Preventing rotation of the input member in the first direction inhibits back-torque applied to the engine 212 when the engine is in an OFF state. When the engine is in an OFF state, the first electric machine 200 may operate as a motor to provide motive torque to the output member 270 for driving the vehicle. Accordingly, a load applied to the one-way clutch device 275 in a first direction 290 engages the one-way clutch device 275 to the casing 260, resulting in the input member 216 becoming grounded. In an exemplary embodiment, the first electric machine 200 can provide the load in the first direction 290 to engage the one-way clutch device 275 while the second electric machine applies a negative load to cancel any output torque resulting from the first electric machine 200 providing the load in the first direction 290. Rotational torques, loads and speeds in the first direction 290 are negative.

Engagement of the one-way clutch device 275 is provided by engaging elements of the one-way clutch device 275 that may include rollers, sprags, rockers or struts, etc., that are able to freely engage one or more cams, notches, recesses, or similar features in the adjacent member, i.e., transmission casing 260, when a load is applied to the one-way clutch device 275 in the first direction 290. A number of clutch designs capable of functioning as a one-way clutch device are envisioned, and this disclosure is not intended to be limited to the particular exemplary embodiments described herein.

Rotation of the input member 216 is always allowed in an opposite second direction 295. When the rotational direction of the input member 216, including a rotational speed and torque/load, is in the second direction, the one-way clutch device 275 is released and disengaged from the casing 260. Thus, the input member 216 is ungrounded and always free to rotate or freewheel in the second direction 295. In an exemplary embodiment, the input member 216 rotates in the second direction when the engine is applying motive torque to the transmission 214. Rotational torques, loads and speeds in the second direction are positive.

A hydraulic clutch is activated by first synchronizing clutch connective surfaces of input and output components and then applying a clamping force to lock the clutch, thereby creating a clutch torque capacity in the clutch, and then transmitting reactive torque through the clutch. The clamping force is provided by hydraulic pressure used to fill a clutch volume chamber and exert a force upon a piston to provide the clamping force. The clutch torque capacity is bi-directional, having a minimum capacity and a maximum capacity. Thus, a load applied in a positive direction exceeding the maximum capacity can result in slippage in the positive direction between input and output components of the clutch and a load applied in a negative direction exceeding the minimum capacity can result in slippage in the negative direction between input and output components. Accordingly, slip detection strategies for hydraulically actuated clutches require monitoring slip in both the negative and positive directions. If the slippage in either direction exceeds a threshold, a failure in the clutch can be determined.

One-way clutch devices are non-hydraulic and only have a capacity in one direction (e.g., the first direction 290). For simplicity, the one direction the one-way clutch device has capacity in is negative. When a load is applied in the one direction, engaging elements of the one-way clutch device provide engagement, and capacity is rapidly attained. A reactive load can be applied to maintain the capacity of the one-way clutch device. When a magnitude of load applied in the one direction exceeds a capacity limit, slippage in the one direction (e.g., negative direction) can result. If the slippage in the one direction exceeds a rotational speed threshold, a failure in the clutch can be determined. It is undesirable to monitor slippage in the other direction (e.g., the second direction 295) because one-way clutch devices are allowed to freewheel in that direction. Embodiments are envisioned to override monitored slippage across the clutch in the free direction to zero to avoid implementing strategies for detecting a failure.

Figure 3:
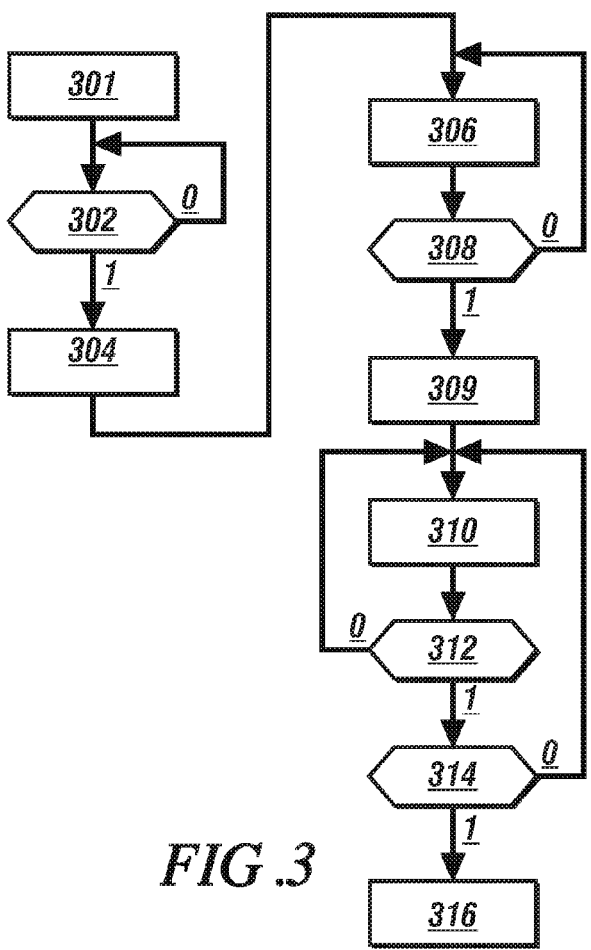
FIG. 3 illustrates an exemplary flowchart for executing an engagement strategy of an exemplary one-way clutch device only having capacity in a first direction and maintaining engagement and preventing lash of the one-way clutch device, in accordance with the present disclosure.

FIG. 3 illustrates an exemplary flowchart for executing an engagement strategy of an exemplary one-way clutch device only having capacity in a first direction and maintaining engagement and preventing lash of the one-way clutch device, in accordance with the present disclosure. It will be appreciated that the exemplary flowchart can be implemented within either the HCP 5 illustrated in FIG. 1. Table 1 is provided as a key to FIG. 3, wherein the numerically labeled blocks and the corresponding functions are set forth as follows.

TABLE 1

| BLOCK | BLOCK CONTENTS |
|---|---|
| 301 | Start |
| 302 | Is an Engine OFF state desired? |
| 304 | Command Engine OFF state and execute an engagement strategy of a one-way clutch device only having capacity in a first direction. |
| 306 | Monitor a relative rotational speed across the one-way clutch device. |
| 308 | Is the relative rotational speed across the one-way clutch device equal to zero? |
| 309 | Model a capacity of the one-way clutch device in accordance with a loading step change profile until a first capacity limit of the one-way clutch device is achieved. |
| 310 | Apply a continuous reactive load to the one-way clutch device in the first direction to maintain engagement and inhibit lash of the one-way clutch device. |
| 312 | Is slippage across the one-way clutch device detected in the first direction? |
| 314 | Does a magnitude of slippage across the one-way clutch device in the first direction exceed a first direction rotational speed threshold? |
| 316 | Detect a failure in the one-way clutch device. |

The exemplary flow chart starts at block 301 and proceeds to decision block 302, where it is determined if an Engine OFF state is desired. The Engine OFF state can be desired in response to a user input to the user interface 6. A "0" indicates an Engine OFF state is not desired and the flowchart reverts back to decision block 302. A "1" indicates the Engine OFF state is desired and the flowchart proceeds to block 304, and simultaneously commands the Engine OFF state. In response to the commanded Engine OFF state, an engagement strategy of the one-way clutch device 275 only having capacity in the first direction 290 of FIG. 2 is executed.

At block 306, relative rotational speed across the one-way clutch device 275 is monitored. Relative rotational speed across the one-way clutch device 275 can be determined based on the difference between the input and output components of the one-way clutch device 275. It will be appreciated that the one-way clutch device 275 is designed to operate synchronously or without slip, requiring substantially zero relative velocity between the input and output components when an engagement load and reactive torque is transmitted through the clutch in the first direction 290. It will be further appreciated that known rotational speeds of known members within the transmission 214 can be utilized to determine the rotational speeds of unknown members within the transmission based on how many degrees of freedom exist within the transmission. Accordingly, rotational speeds of the input and output components of the one-way clutch device can be monitored. In an exemplary embodiment, the relative rotational speed across the one-way clutch device 275 can be determined based on the engine speed.

Decision block 308 determines if the relative rotational speed across the one-way clutch device is equal to zero. A "0" indicates the relative rotational speed across the one-way clutch device, i.e., relative rotational speed between the input and output components, is not equal to zero, and the flowchart reverts back to block 306. A "1" indicates the relative rotational speed across the one-way clutch device is equal to zero, and the flowchart proceeds to block 309. In one embodiment, the relative rotational speed across the one-way clutch device only needs to be within a vicinity of zero, for instance, between −30 RPM and 30 RPM.

At block 309, execution of the engagement strategy includes modeling a capacity of the one-way clutch device in accordance with a loading step change profile until a first capacity limit of the one-way clutch device is achieved. Modeling the capacity of the one-way clutch device includes incrementally applying an engagement load in the first direction in accordance with the loading step change profile until the first capacity limit is achieved. In an exemplary embodiment, the first capacity limit corresponds to a magnitude of minimum capacity of the one-way clutch device 275 required for engagement. The flowchart proceeds to block 310 once the first capacity limit is achieved. Incrementally applying the engagement load in the first direction allows for engaging elements of the one-way clutch device 275 that may include rollers, sprags, rockers or struts, etc., to freely engage one or more cams, notches, recesses, or similar features in the adjacent member, i.e., transmission casing 260, at initial smaller loads and securing the engagement with increasingly larger loads until the first capacity limit is achieved.

At block 310, a continuous reactive load is applied to the one-way clutch device in the first direction to maintain engagement and inhibit lash of the one-way clutch device. In an exemplary embodiment, the reactive load is sufficient for maintaining the first capacity limit of the one-way clutch device. Thus, the reactive load takes up lash in the one-way clutch device. In FIG. 1, both the reactive and engagement loads applied in the first direction 290 are generated by the first electric machine 20. In FIG. 2, the first electric machine 200 can be configured to apply the reactive and engagement loads to the one-way clutch device 275 in the first direction 290, while the second electric machine 220 can be configured to drive the vehicle. When the first electric machine 200 is applying the reactive and engagement loads to the one-way clutch device 275 in the first direction 290, the second electric machine 220 can be configured to produce negative output torque by reacting against the first clutch device 254 to produce zero output torque at the output member 270 coupled to the driveline of the vehicle.

Decision block 312 determines if slippage across the one-way clutch device is detected in the first direction. Slippage can result if a second capacity limit of the one-way clutch device is exceeded. The second capacity limit corresponds to a magnitude of maximum capacity of the one-way clutch device allowed for maintaining engagement of the one-way clutch device. The second capacity limit corresponding to the magnitude of maximum capacity can be determined based on a hardware specific torque limit of the one-way clutch device. A "0" indicates slippage across the one-way clutch device is not detected in the first direction and the flowchart reverts back to block 310 and continuous to apply the reactive load in the first direction. A "1" indicates slippage in the first direction is detected, and the flowchart proceeds to decision block 314. If slippage is detected in the first direction, a failure detection strategy for the one-way clutch device is executed. As aforementioned, the one-way clutch device includes a mechanical diode always allowing rotation of the input member 216 in the second direction, and thus, any slippage detected in the second direction is acceptable. Accordingly, if slippage is detected in the second direction, initiation of any failure detection strategies are ignored and a failure is never detected in the one-way clutch device, i.e., any slippage detected in the second direction is treated as zero slippage detected.

Decision block 314, i.e., the failure detection strategy, compares the slippage between the input and output components in the first direction to a first direction rotational speed threshold. A "0" indicates the magnitude of slippage across the one-way clutch device in the first direction does not exceed the first direction rotational speed threshold, and the flowchart reverts back to block 310. A "1" indicates the magnitude of slippage across the one-way clutch device in the first direction exceeds the first direction rotational speed threshold and proceeds to block 316.

At block 316, a failure in the one-way clutch device is detected. Accordingly, a torque actuator applying the reactive load in the first direction to the one-way clutch device can reduce the applied load to prevent the slip exceeding the first direction rotational speed threshold.

Figure 4:
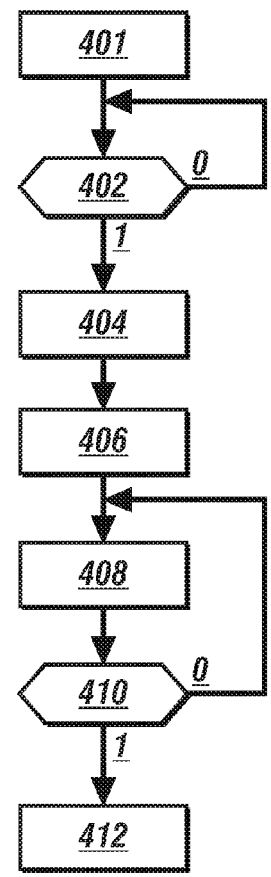
FIG. 4 illustrates an exemplary flowchart for executing disengagement strategy of an exemplary one-way clutch device only having capacity in a first direction, in accordance with the present disclosure.

FIG. 4 illustrates an exemplary flowchart for executing a disengagement strategy of an exemplary one-way clutch device only having capacity in a first direction, in accordance with the present disclosure. It will be appreciated that the exemplary flowchart can be implemented within either the HCP 5 illustrated in FIG. 1. Table 2 is provided as a key to FIG. 4, wherein the numerically labeled blocks and the corresponding functions are set forth as follows.

TABLE 2

| BLOCK | BLOCK CONTENTS |
|---|---|
| 401 | Start |
| 402 | Is an Engine ON state desired? |
| 404 | Model the capacity of the one-way clutch device in accordance with an unloading step change profile from the first capacity limit |

TABLE 2-continued

| BLOCK | BLOCK CONTENTS |
|---|---|
| | until a zero capacity of the one-way clutch device is achieved. |
| 406 | Command an Engine ON state when the modeled capacity of the one-way clutch device is equal to zero capacity. |
| 408 | Monitor slippage across the one-way clutch device in a second opposite direction subsequent to attaining the engine ON state. |
| 410 | Is the slippage across the one-way clutch device in the second opposite direction less than a second direction rotational speed threshold? |
| 412 | Detecting a stuck condition of the one-way clutch device. |

The exemplary flow chart 400 starts at block 401 and proceeds to block 402. The flowchart can be executed concurrently with the flowchart of FIG. 3 during operation of the vehicle.

At decision block 402, it is determined whether an Engine ON state is desired. The Engine ON state can be desired in response to a user input to the user interface 6. A "0" indicates the Engine ON state is not desired and the flowchart reverts back to the decision block 402. A "1" indicates the Engine ON state is desired and the flowchart proceeds to block 404. A disengagement strategy of the one-way clutch device is executed in response to the Engine ON state being desired.

At block 404, capacity of the one-way clutch device is modeled in accordance with an unloading step change profile from the first capacity limit until a zero capacity of the one-way clutch device is achieved. Modeling the capacity in accordance with the unloading step change profile includes decrementally applying the engagement load in the first direction in accordance with the unloading step change profile until the zero capacity of the one-way clutch device is achieved.

At block 406, the engine ON state is commanded when the modeled capacity of the one-way clutch device is equal to zero capacity. In other words, the engine ON state is not commanded until the engagement load applied to the one-way clutch device in the second direction is completely offloaded.

At block 408, slippage across the one-way clutch device in a second opposite direction is monitored subsequent to attaining the engine ON state. In an exemplary embodiment, the engine ON state is attained when the engine is fueled and spinning. Monitoring slippage can include monitoring zero slippage.

At decision block 410, it is determined whether the slippage across the one-way clutch device in the second opposite direction is less than a second direction rotational speed threshold. A "0" indicates the slippage across the one-way clutch device in the second direction is at least the second direction rotational speed threshold and the flowchart reverts back to block 408. A properly operating one-way clutch will always indicate slippage in the second direction to exceed the second direction rotational speed threshold due to the one-way clutch always permitting the input member to rotate in the second direction. A "1" indicates the slippage across the one-way clutch device in the second direction is less than the second direction rotational speed threshold and the flowchart proceeds to block 412, wherein a stuck condition of the one-way clutch is detected. Thus, a "1" indicates that the one-way clutch device is not permitting rotation in the second direction as is expected.

Figure 5:
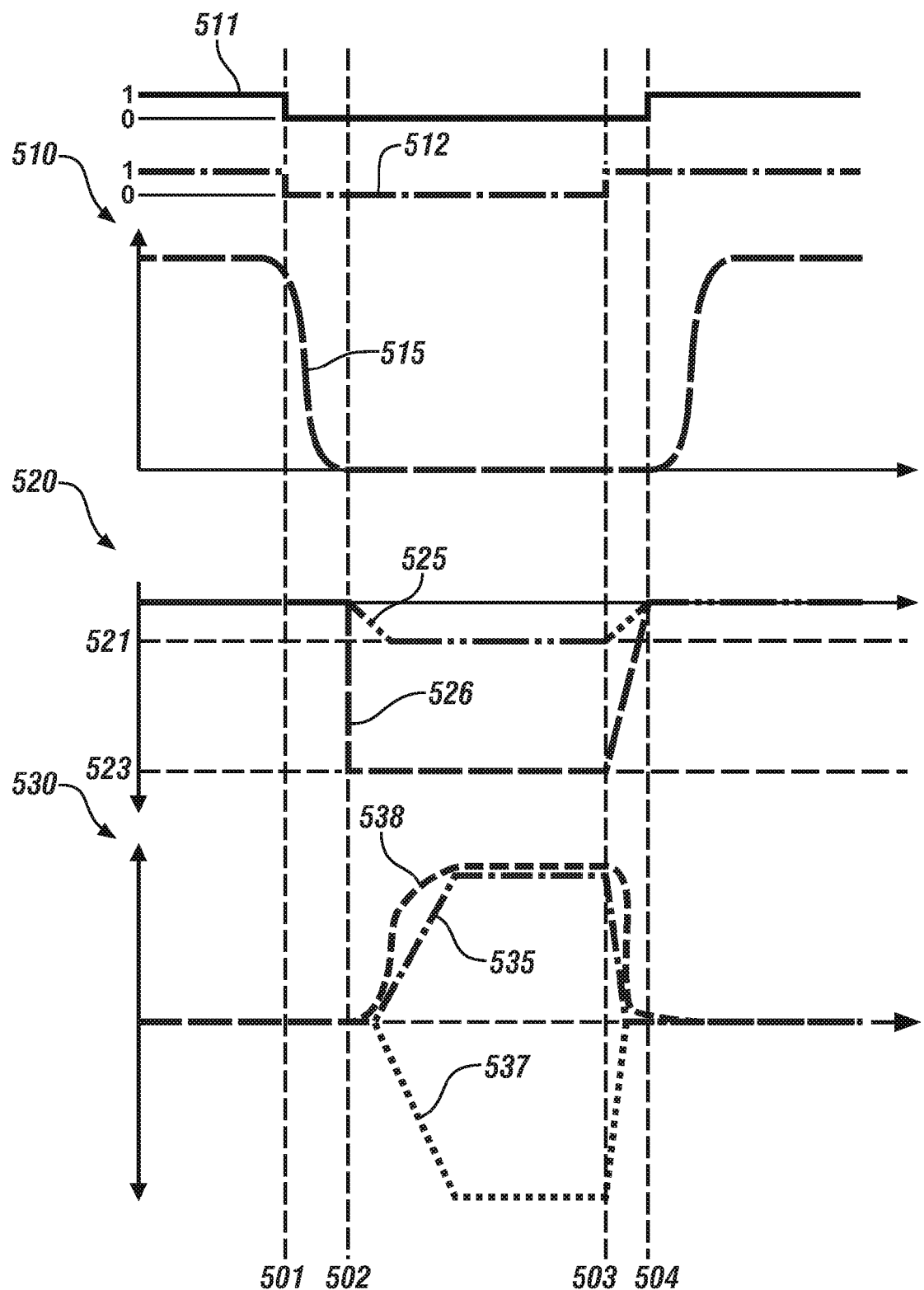
FIG. 5 illustrates a first plot 510, a second plot 520 and a third plot 530 depicting a relationship between engine speed, a desired engine state, a commanded engine state, a modeled torque capacity of a one-way clutch device and a modeled torque capacity of a hydraulic clutch device, in accordance with the present disclosure.

FIG. 5 illustrates a first plot 510, a second plot 520 and a third plot 530 depicting a relationship between engine speed, a desired engine state, a commanded engine state, a modeled torque capacity of a one-way clutch device and a modeled torque capacity of a hydraulic clutch device in accordance with the present disclosure. The plots 510, 520, 530 will be described with reference to the powertrain system 210 of FIG. 2. The horizontal x-axis in each of plots 510, 520, 530 denotes time in seconds. Dashed vertical lines 501, 502, 503, 504 denote first, second, third and fourth times, respectively, for managing torque capacity of the one-way clutch device.

Referring to plot 510, a first control sequence 511 of commanded engine state, a second control sequence 512 of desired engine state, and an engine speed profile 515 are illustrated. The vertical y-axis denotes engine speed in RPM, wherein the engine speed at the horizontal x-axis is equal to 0 RPM. The first control sequence 511 of commanded engine state corresponding to a value of "1" indicates the engine is commanded to an engine ON state. A value of "0" indicates the engine is commanded to an engine OFF state. The second control sequence 512 of the desired engine state corresponding to a value of "1" indicates the powertrain desires an engine ON state. A value of "0" indicates the powertrain 210 desires an engine OFF state. The desired engine state by the powertrain 210 can be determined based upon an operator input to the user interface 6.

Referring to plot 520, a modeled torque capacity profile 525 and a modeled threshold capacity profile 526 of the one-way clutch device is illustrated. The vertical y-axis denotes load in Nm from 0 to −200 Nm, wherein the load is equal to 0 Nm at the horizontal x-axis. In an exemplary embodiment, the one-way clutch device includes the one-way clutch device 175 of FIG. 2 having capacity in the negative first direction. Dashed horizontal line 521 denotes a first capacity limit corresponding to a magnitude of minimum capacity of the one-way clutch device required for engagement. Dashed horizontal line 523 denotes a second capacity limit corresponding to a magnitude of maximum capacity of the one-way clutch device allowed for maintaining engagement of the one-way clutch device. In a non-limiting example, the second limit is equal to −200 Nm applied to the one-way clutch device in the first direction corresponding to a magnitude of 200 Nm. It will be understood that while the exemplary embodiment illustrated in FIG. 5 illustrates the dashed horizontal line 521 being greater than the dashed horizontal line 523, the magnitude of dashed horizontal line 523 is greater than the magnitude of the dashed horizontal line 521. It will be further understood for one-way clutches having capacity in the opposite positive second direction, the modeled torque capacity profile 525 and the modeled threshold capacity profile 526 would be mirrored with respect to the horizontal x-axis.

Referring to plot 530, a modeled maximum torque capacity profile 535, a modeled minimum torque capacity profile 537 and a hydraulic pressure profile 538 are illustrated for a hydraulic clutch device. The vertical y-axis denotes load in Nm, wherein the horizontal x-axis is equal to 0 Nm. Plot 530 is illustrated for comparative purposes only to depict the bi-directional torque capacity of the hydraulic clutch device in relation to the uni-directional torque capacity of the one-way clutch device.

At the first time 501, an engine OFF state is desired and the engine ON state is commanded. In response to the engine OFF command, an engagement strategy of the one-way clutch device is executed as the engine speed profile 515 begins to decelerate until the speed is 0 at the second time 502. The one-way clutch device is disengaged and is unloaded between the first and second times 501, 502, respectively. Thus, the modeled torque capacity profile 525 and the modeled threshold capacity profile 526 are zero Nm between the first and second times 501, 502, respectively.

At the second time 502, the engine speed profile is zero and engagement of the of the one-way clutch device occurs. It will be appreciated that a relative rotational speed across the one-way clutch device, i.e., relative rotational velocity between input and output components of the one-way clutch device, is required for engagement of the one-way clutch device. In the exemplary embodiment, the relative rotational speed across the one-way clutch device 175 is equal to zero when the engine speed is equal to zero and no load is applied to the one-way clutch device in the negative first direction. The torque capacity profile 525 is modeled in accordance with the loading step change profile until the first capacity limit (dashed horizontal line 521) corresponding to a magnitude of minimum capacity of the one-way clutch device is achieved, the loading step change profile commences only when the engine speed profile 515 is equal to zero. In other words, an engagement load is incrementally applied in the first direction in accordance with the loading step change profile until the magnitude of minimum capacity is achieved. It will be appreciated that although the torque capacity profile 525 decreases toward the first capacity limit in plot 520, the magnitude of the engagement load in the first direction is increasing. The reactive load is continuously applied to the one-way clutch in the first direction to maintain engagement and inhibit lash of the one-way clutch device until the third time 503.

At the third time 503, an engine ON state is desired. In response to the desired engine ON state, the disengagement strategy of the one-way clutch device is executed and the torque capacity profile 525 is modeled in accordance with the unloading step change profile from the first capacity limit (e.g., dashed horizontal line 531) until the zero capacity of the one-way clutch device is achieved at the fourth time 504. In other words, the engagement load in the first direction is decrementally applied until the zero capacity of the one-way clutch is achieved at the fourth time 504.

At the fourth time 504, the engine ON state is commanded. Hence, the engine ON state is delayed until the one-way clutch device is unloaded/offloaded. Acceleration of the engine speed profile 515 produces load in the second positive direction and disengages the one-way clutch device. As aforementioned, the one-way clutch device is always permitted to rotate in the positive second direction, and thus, the input member is ungrounded and rotating in the positive second direction.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain system comprising an internal combustion engine, at least one electric machine and an electro-mechanical transmission operative to transmit torque to a driveline, the method comprising: executing, within a control module, an engagement strategy of a one-way clutch device only having capacity in a first direction comprising:
    modeling a capacity of the one-way clutch device in accordance with a loading step change profile until a first capacity limit of the one-way clutch device is achieved; and
    controlling the at least one electric machine to apply a continuous reactive load to the one-way clutch device in the first direction to maintain engagement and inhibit lash of the one-way clutch device.

2. The method of claim 1 wherein the one-way clutch device comprises a mechanical diode preventing rotation of a transmission input member mechanically coupled to the engine in the first direction when the mechanical diode is engaged and always allowing rotation of the transmission input member in an opposite second direction, wherein preventing rotation of the transmission input member in the first direction inhibits back-torque applied to the engine.

3. The method of claim 1 wherein the reactive load is selected to be sufficient for maintaining the first capacity limit of the one-way clutch device.

4. The method of claim 1 wherein the engagement strategy of the one-way clutch device is executed in response to an engine OFF command.

5. The method of claim 1 wherein modeling the capacity of the one-way clutch device comprises:
    incrementally applying an engagement load in the first direction in accordance with the loading step change profile until the first capacity limit is achieved.

6. The method of claim 1 wherein modeling the capacity of the one-way clutch device comprises:
    monitoring engine speed; and
    modeling the capacity of the one-way clutch device in accordance with the loading step change profile only when the monitored engine speed is equal to zero.

7. The method of claim 1 wherein modeling the capacity of the one-way clutch device comprises:
    monitoring relative rotational speed across the one-way clutch device; and
    modeling the capacity of the one-way clutch device in accordance with the loading step change profile only when the monitored relative rotational speed across the one-way clutch device is equal to zero.

8. The method of claim 1 further comprising:
    monitoring relative rotational speed across the one-way clutch device after engagement of the one-way clutch device;
    when slippage across the one way clutch device is detected in the first direction, executing a failure detection strategy comprising:
        comparing the slippage across the one-way clutch device in the first direction to a first direction rotational speed threshold; and
        detecting a failure in the one-way clutch device if a magnitude of the slippage across the one-way clutch device in the first direction is greater than the first direction rotational speed threshold.

9. The method of claim 8 further comprising:
    when slippage across the one way clutch device is detected in a second direction opposite the first direction, ignoring execution of the failure detection strategy and never detecting a failure in the one-way clutch device.

10. The method of claim 1 further comprising:
    executing a disengagement strategy of the one-way clutch device comprising:
        modeling the capacity of the one-way clutch device in accordance with an unloading step change profile from the first capacity limit until a zero capacity of the one-way clutch device is achieved; and
        commanding an engine ON state when the modeled capacity of the one-way clutch device is equal to zero capacity.

11. The method of claim 10 wherein the disengagement strategy of the one-way clutch device is executed when an engine ON state is desired.

12. The method of claim 10 wherein modeling the magnitude capacity of the one-way clutch device comprises:
decrementally applying the engagement load in the first direction in accordance with the unloading step change profile until the zero capacity of the one-way clutch device is achieved.

13. The method of claim 10 further comprising:
monitoring slippage across the one-way clutch device in a second direction opposite the first direction subsequent to attaining the engine ON state;
comparing the slippage across the one-way clutch device in the second direction to a second direction rotational speed threshold; and
detecting a stuck condition of the one-way clutch device if a magnitude of the slippage of the one-way clutch device in the second direction is less than the second direction rotational speed threshold.

14. The method of claim 1 wherein the first capacity limit corresponds to a magnitude of minimum capacity of the one-way clutch device required for engagement.

15. Method for controlling a powertrain system comprising an internal combustion engine, at least one electric machine and an electro-mechanical transmission operative to transmit torque to a driveline, the method comprising: executing, within a control module a strategy comprising:
monitoring relative rotational speed between input and output components of a one-way clutch device, the one-way clutch device only having capacity in a first direction;
in response to an engine OFF command, executing an engagement strategy of the one-way clutch device comprising:
only when the relative rotational speed between the input and output components is equal to zero, controlling the at least one electric machine to incrementally apply an engagement load in the first direction to the one-way clutch device in accordance with a loading step change profile until a first capacity limit of the one-way clutch device is achieved;
controlling the at least one electric machine to apply a continuous reactive load to the one-way clutch device in the first direction to maintain engagement and inhibit lash of the one-way clutch device;
when an engine ON state is desired, executing a disengagement strategy of the one-way clutch device comprising:
controlling the at least one electric machine to decrementally apply the engagement load in the first direction in accordance with an unloading step change profile from the first capacity limit until a zero capacity of the one-way clutch device is achieved; and
commanding an engine ON state when the modeled capacity of the one-way clutch device is equal to zero capacity.

16. The method of claim 15 wherein the input components of the one-way clutch device are rotatably coupled to a transmission input member and comprise at least one engagement element configured to engage the output components coupled to a stationary casing of the transmission, the one-way clutch device preventing rotation of the transmission input member in the first direction when engaged and always allowing rotation of the transmission input member in an opposite second direction.

17. The method of claim 15 further comprising:
when slippage between the input and output components is detected in the first direction, executing a failure detection strategy comprising:
comparing the slippage between the input and output components in the first direction to a first direction rotational speed threshold; and
detecting a failure in the one-way clutch device if a magnitude of the slippage across the one-way clutch device in the first direction is greater than the first direction rotational speed threshold.

18. The method of claim 17 further comprising:
when slippage between the input and output components is detected in a second direction opposite the first direction, ignoring execution of the failure detection strategy and never detecting a failure in the one-way clutch device.

19. The method of claim 15 further comprising:
subsequent to attaining the engine ON state, comparing slippage between the input and output components in a second direction opposite the first direction to a second direction rotational speed threshold;
detecting a stuck condition of the one-way clutch device if a magnitude of the slippage between the input and output components in the second direction is less than the second direction rotational speed threshold.

20. An apparatus for controlling a powertrain comprising an electro-mechanical transmission mechanically-operatively coupled to an internal combustion engine and at least one electric machine adapted to selectively transmit mechanical power to an output member via selective application of a plurality of hydraulically-applied torque transfer clutches, comprising:
an input member mechanically coupling the engine and the transmission;
a one-way clutch device comprising a mechanical diode preventing rotation of the transmission input member in a first direction when the mechanical diode is engaged and always allowing rotation of the transmission input member in an opposite second direction, wherein preventing rotation of the input member in the first direction inhibits back-torque applied to the engine;
a control module configured to execute an engagement strategy of a one-way clutch device only having capacity in a first direction, said engagement strategy comprising:
modeling a capacity of the one-way clutch device in accordance with a loading step change profile until a first capacity limit of the one-way clutch device is achieved; and
controlling the at least one electric machine to apply a continuous reactive load to the one-way clutch device in the first direction to maintain engagement and inhibit lash of the one-way clutch device.

* * * * *